United States Patent
Diaz et al.

(10) Patent No.: US 6,865,037 B2
(45) Date of Patent: Mar. 8, 2005

(54) SYSTEM AND METHOD FOR ADJUSTING THE OPTICAL PATH LENGTH OF AN OPTICAL PATH

(75) Inventors: Dennis Carlo Diaz, Ft. Collins, CO (US); Geraint Owen, Palo Alto, CA (US); Susan Hunter, Ft. Collins, CO (US); George M. Clifford, Jr., Los Altos Hills, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 103 days.

(21) Appl. No.: 10/272,674

(22) Filed: Oct. 17, 2002

(65) Prior Publication Data

US 2004/0075919 A1 Apr. 22, 2004

(51) Int. Cl.[7] ............................................. G02B 5/08
(52) U.S. Cl. ..................... 359/837; 359/832; 359/833
(58) Field of Search .............................. 359/837, 832, 359/833–834, 223, 247, 291, 463; 372/32

(56) References Cited

U.S. PATENT DOCUMENTS

| 5,182,585 | A | * | 1/1993 | Stoner ......................... 351/41 |
| 6,587,288 | B2 | * | 7/2003 | Erz et al. .................... 359/885 |
| 6,667,999 | B2 | * | 12/2003 | Hasson et al. ................ 372/36 |

* cited by examiner

Primary Examiner—Mohammad Sikder

(57) ABSTRACT

Systems and methods for adjusting optical path length of an optical path are provided. The systems and methods can be used to controllably adjust optical path length in an external cavity laser. A representative optical path having a first end and a second end comprises a first transparent refractive element located in the optical path between the first end and the second end. The transparent refractive element is adjustable to adjust the optical path length of the optical path without changing the physical distance between the first end and the second end. A representative method includes introducing a transparent refractive element into the optical path and adjusting the transparent refractive element to change the optical path length without changing the physical distance between the first end and the second end of the optical path.

21 Claims, 8 Drawing Sheets

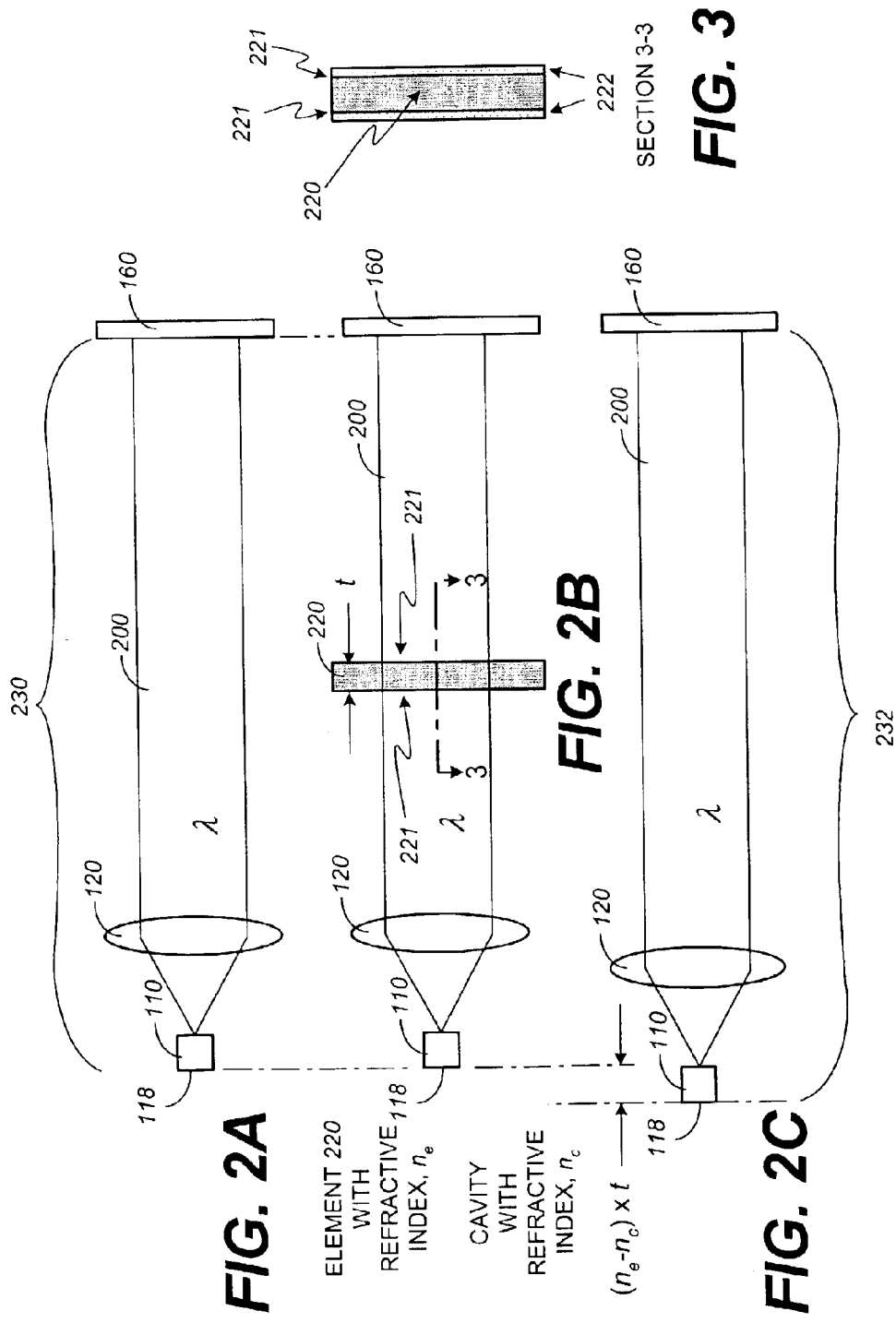

SYSTEM AND METHOD FOR ADJUSTING THE OPTICAL PATH LENGTH OF AN OPTICAL PATH

TECHNICAL FIELD

The present invention generally relates to optics. More specifically, the invention relates to a system and method for adjusting optical path length in an optical system.

BACKGROUND

Semiconductor diode lasers have been used extensively as transmitters for fiber-optic communications. In one common and low-cost implementation, edges of two-opposing end facets of a semiconductor gain media are cleaved and/or polished to form resonant-reflective surfaces and to provide feedback for laser operation. This type of laser, commonly called a Fabry-Perot (FP) laser, typically emits light in multiple longitudinal modes and has large output line-widths.

In Dense-Wavelength-Division Multiplexing (DWDM) fiber-optic communication technology, many closely-spaced wavelengths or channels are transmitted simultaneously along a single fiber or fiber bundle. Typical spacing of channels in DWDM systems can range from 5 nanometers (nm) to as little as 0.4 nm (for 50 GHz International Telecommunication Union (ITU) standard channel spacing) between channels. Closer channel spacings are envisioned. This creates the need for a laser with a much narrower output line-width (i.e., frequency range) than a typical FP laser. To implement effective DWDM systems, stable and accurate transmitters of selectively predetermined wavelengths are needed for individual channels. In addition, stable and accurate wavelength-selective receivers are needed to selectively remove or receive the individual channel wavelengths to minimize crosstalk from other channels. For a DWDM system to operate efficiently, the transmitter and receiver for a given channel should be tuned to the same wavelength within a given tolerance.

There are at least two reasons why it would be advantageous to replace fixed wavelength lasers by tunable lasers in DWDM applications. The first reason has to do with inventory requirements. A typical DWDM system with 50 GHz-channel spacing uses one fixed-wavelength transmitter for each of 80 or more different wavelengths. Consequently, 80 individual fixed wavelength lasers have to be kept on hand to fabricate new systems and as spares to guard against the possibility of laser failure. However, all 80 of these fixed wavelength spare lasers could be replaced by a single tunable laser. The availability of tunable lasers would represent a very significant savings in inventory costs. The second advantage associated with tunable lasers is that their use would allow the configuration of a communication network to be changed dynamically.

A tunable external cavity laser (ECL) is a strong candidate for such applications. A tunable ECL is a laser device that can be configured to generate light of a particular wavelength within a tuning range. This type of device is described, for example, in "Widely Tunable External Cavity Diode Lasers," Day et al., SPIE, Vol. 2378, P. 35–41. In the diode laser devices described by Day et al., an anti-reflective layer is placed on one facet of a semiconductor diode that provides an optical gain medium. A collimating lens captures the emitted light, and a diffraction grating, acting in part as an external cavity reflector, is used to select or tune the wavelength λ, of the laser. Lasing action occurs, generally, provided that the grating selects a wavelength within the diode's spectral gain region and where a substantial portion of the light is returned to the optical gain medium. Tuning action occurs when a properly positioned diffraction grating is controllably rotated about a fixed axis. Tuning may also involve adjusting the length of the external cavity between the back facet of the diode and the tuning mirror.

As illustrated in FIG. 1, ECL 10 includes a semiconductor light-emitting diode 11 having a reflective rear facet 18, a collimating lens 12, a diffraction grating 14, and a tuning mirror 16. The diode 11 serves as an optical gain medium. The diffracting surface 15 of the diffraction grating 14 and the reflecting surface 17 of the tuning mirror 16 are arranged such that tangent lines extended along surfaces 15, 17 intersect at pivot point 30. Neglecting the refractive indices of the optical elements in the optical cavity 13, the diode 11 is placed such that a tangent line extended along its rear facet 18 intersects with the other tangent lines at pivot point 30. The reflective rear facet 18 of the diode 11 and the reflecting surface 17 define the ends of external cavity 13. When the tuning mirror 16 is attached to a member (not shown for simplicity of illustration) that controllably rotates about pivot point 30, the wavelength of the ECL 10 is continuously tunable.

In operation, the diode 11 emits light forming a first beam portion 20a that is incident on the diffracting surface 15 of the diffraction grating at an angle of incidence, $\phi_{INC}$. The first beam portion 20a is diffracted at an angle, θ, from the diffracting surface 15 of the diffraction grating 14. The diffraction angle, θ, is defined by the angle between the tuning mirror 16 and the diffraction grating 14. The diffracted light forms a second beam portion 20b directed at the reflecting surface 17 of the tuning mirror 16. When, as here, the second beam portion 20b impinges orthogonally on the reflecting surface 17 of the tuning mirror 16, a substantial portion of the light is reflected back toward the diode 11 in the reverse direction of the second beam portion 20b and the first beam portion 20a.

The diffraction grating 14 and tuning mirror 16 collectively constitute a wavelength filter. The tuning mirror 16 defines one end of the external cavity 13 of ECL 10 and is mounted on a pivot. The angle of rotation of the tuning mirror 16 about the pivot selects a specific diffracted wavelength and adjusts the optical path length of the external cavity 13 to be an integral multiple of the selected wavelength. Light propagates between the optical gain medium of the diode 11, the diffraction grating 14, and the tuning mirror 16. For a given grating pitch, $p_g$, and angle of incidence, $\phi_{INC}$, of the light incident on the diffraction grating 14, the diffraction angle, θ, as selected by the rotation angle of the reflecting surface 17 of the tuning mirror 16 about pivot point 30, determines the operating wavelength, λ, through the following relationship:

$$\lambda = p_g [\sin \theta + \sin \phi_{INC}].$$

To provide continuous wavelength tuning without mode hops, lines tangential to the surfaces of the diffraction grating 14, the tuning mirror 16, and the reflective rear facet 18 should intersect at a common pivot point 30 as illustrated in FIG. 1. To tune the laser, the tuning mirror 16 is rotated in such a way that the tangent to its reflecting surface 17 always passes through pivot point 30. The general configuration shown in FIG. 1 is commonly called a Littman ECL or a Littman configuration.

A Littrow ECL (not shown) consists of a diode, a collimating lens, and a reflective diffraction grating. The diode, which serves as an optical gain medium, may be anti-reflection coated. However, it is possible to operate the system with standard diodes. The collimated light is coupled to the diffraction grating. The first order diffraction beam is directed back into the diode. The zero$^{th}$ order diffraction beam is coupled out of the laser. One of the advantages of this laser design is that it is possible to achieve higher output power than with other types of laser systems.

The arrangement illustrated in the Littman ECL 10 is an easy way to visualize external laser cavity construction, but the arrangement only provides continuous wavelength tuning without mode hops in the case where the index of refraction is uniform throughout the external cavity 13. In reality, the external cavity of an ECL contains elements with different indices of refraction. For example, the refractive index of the optical gain medium is generally about 3.5 and the index of refraction of most collimating lenses is about 1.5. Consequently, to provide continuous wavelength tuning, the diode 11 and the collimating lens 12 are translated along the path of first beam portion 20a. With correct translation of the diode 11 and the above mentioned alignment of the other components (i.e., diffracting surface 15 of the diffraction grating 14, reflecting surface 17 of the tuning mirror 16, and pivot point 30), continuous wavelength tuning can be obtained. Similarly, in the Littrow configuration, correct translation of the optical gain medium, a collimating lens, and the reflective diffraction grating are required for continuous wavelength tuning.

The required mechanical alignment and translation tolerance of the optical components in an external cavity laser to achieve a continuous wavelength tunable configuration (e.g., in the Littman ECL 10 illustrated and described in FIG. 1, as well as in a Littrow configuration ECL) is on the order of micrometers. Implementing this level of accuracy in alignment is a severe challenge because of manufacturing tolerances, the capabilities of contemporary assembly equipment, and positional variability due to mounting adhesives. All these factors affect alignment of the optical components. An additional factor that contributes to the alignment challenge is that the length and refractive index of a particular diode optical gain medium are not known before fabrication of the assembly. This additional uncertainty may add tens of micrometers to the above-mentioned alignment errors.

One prior art approach to aligning the components in an ECL is to first assemble the components in an approximate arrangement. Next, a post-fabrication alignment is performed. The post-fabrication alignment is typically conducted by shifting the diode 11 along its optical axis (i.e., along the path defined by the first beam portion 20a) to adjust the physical length of the optical cavity until continuous tuning is achieved.

Generally, the diode 11 is shifted while monitoring the emitted output. At a particular diode position, the number of mode hops observed when the tuning mirror 16 is rotated about pivot 30 will be minimized and/or eliminated, thus establishing the optimum position for the diode 11. This post-fabrication alignment procedure uses a high-resolution translation mechanism. The translation mechanism is typically used only once in the lifetime of each ECL 10 to correctly position the diode 11 in the external cavity 13. The high-resolution translation mechanism adds significantly to the cost of the ECL 10. Alternatively, a reusable fixture can be used to correctly locate the diode 11 during assembly.

In light of pressures to reduce the manufacturing challenges associated with precise alignment, as well as competitive pressures to reduce the cost of tunable ECL devices, it can be appreciated that there is a need for systems and methods that address the above-described and/or other shortcomings of the prior art, while providing a manufacturable working device.

SUMMARY

Optical systems and methods for adjusting optical path length in an optical system are disclosed. The systems eliminate the need for a high-resolution translation mechanism for positioning physical elements in an optical system. In particular, the optical system permits fine-tuning of optical-path length, while maintaining a fixed distance between a first end and a second end defining the optical cavity.

A representative optical path having a first end and a second end comprises a first transparent refractive element located in the optical path between the first end and the second end. The transparent refractive element is adjustable to adjust the optical path length of the optical path without changing the physical distance between the first end and the second end. The optical path length of an optical path is the sum of the product of the thickness (along the axis of the optical path) and the index of refraction of all elements constituting the optical path. "Elements" encompasses both physical elements in the optical path, as well as segments of the optically-transmissive medium between the physical elements, e.g., air between the elements in the optical path. Physical elements include semiconductor diodes, lenses, mirrors, transparent refractive elements, etc. Physical elements that reflect incident light define end points of the optical path. An adjustable optical path length enables tuning of the laser such that the optical path length=$n\lambda$.

The embodiments illustrated and described below include semiconductor diodes as an optical gain medium. However, the optical systems and methods described below are compatible with numerous light sources. "Light," as used in this disclosure, is electromagnetic radiation in the spectral range that includes infrared, visible, ultraviolet, and X-rays.

In a first embodiment, the transparent refractive element is a shim. In a variation of the first embodiment, a plurality of shims is selected for placement within the optical path. An optical system using this variation can achieve a wide range of optical path lengths by combining select shims of various thicknesses and/or refractive indices.

In a second embodiment, the transparent refractive elements are a fixed wedge and a movable wedge that are located in the optical path. The fixed and movable wedges are arranged such that the combined thickness of the wedges in the optical path continuously changes as the movable wedge slides over the surface of the fixed wedge, thus permitting a continuously variable optical path length over the thickness of the movable wedge. In a variant of the second embodiment, both wedges are movable.

In a third embodiment, continuously variable adjustment of the optical path length is provided by controllably rotating a single transparent refractive element arranged in the optical path.

A representative method for changing the optical path length of an optical path having a first end and a second end includes introducing a transparent refractive element into the optical path and adjusting the transparent refractive element to change the optical path length without changing the physical distance between the first end and the second end of the optical path.

Other systems, methods, and features of the present invention will be or become apparent to one skilled in the art upon examination of the following drawings and detailed description. It is intended that all such additional systems, methods, and features are included within this description, are within the scope of the present invention, and are protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 2A–2C are a set of schematics illustrating the effect of introducing a representative transparent refractive element into an optical path.

FIG. 3 is a cross-sectional view of the representative transparent refractive element of FIG. 2B in direction 3—3.

DETAILED DESCRIPTION

Figure 1:
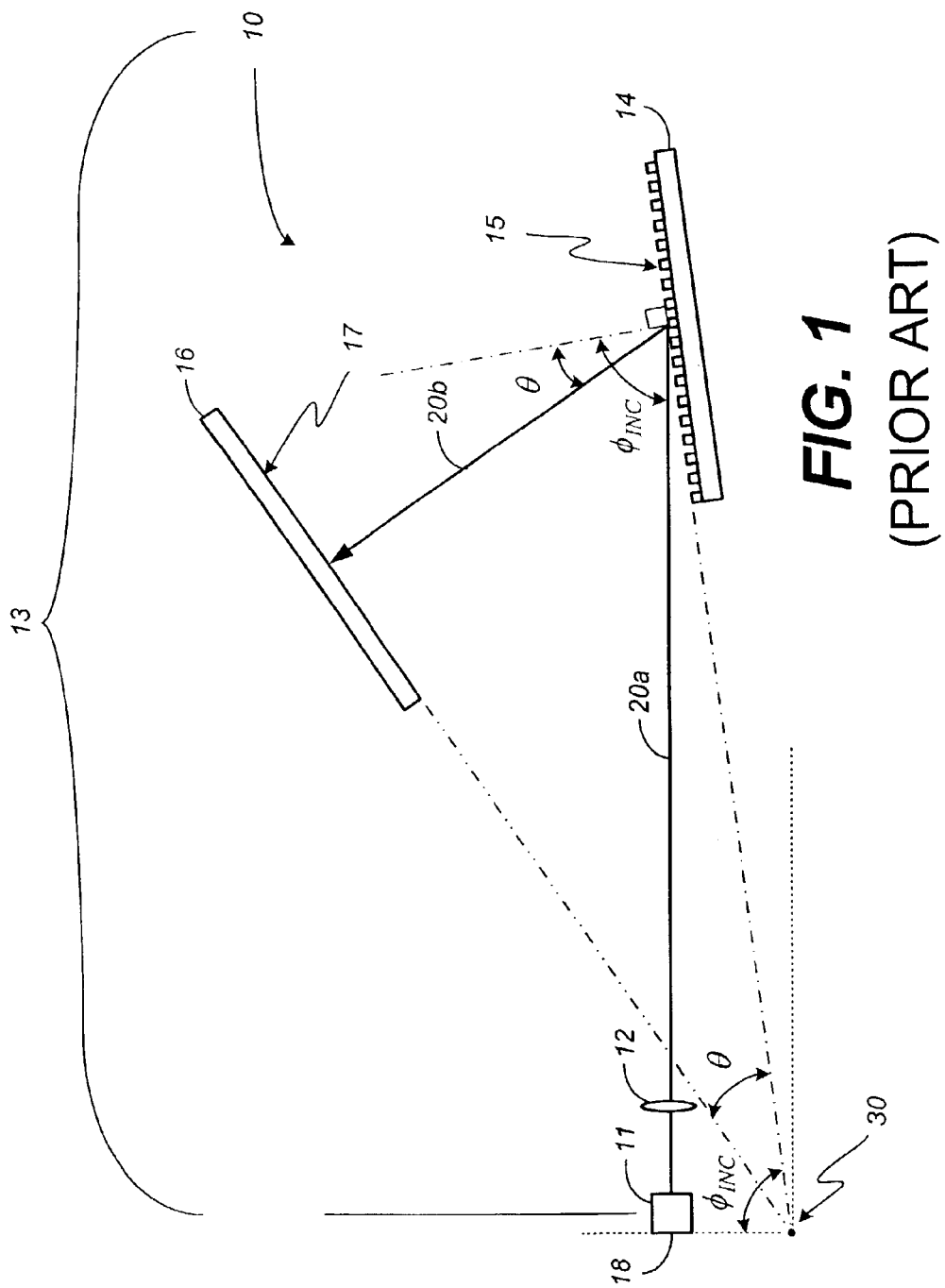
FIG. 1 is a schematic diagram of a prior art Littman configuration of a tunable external cavity laser (ECL).

A transparent refractive element is introduced in an optical path to controllably adjust the optical path length without changing the physical length of the optical path. The embodiments illustrated and described below enable continuous wavelength tuning of an ECL to be achieved without mode hops. This approach eliminates the need for fine mechanical translation of both the optical gain medium and/or optical elements (e.g., diffraction grating and tuning mirror). For simplicity, the embodiments of an ECL described below are depicted with an unfolded external cavity. The grating has been omitted and the tuning mirror is shown in a stationary position normal to the incident light.

A transparent refractive element is introduced in an optical path to controllably adjust the optical path length without changing the physical length of the optical path. The embodiments illustrated and described below, enable continuous wavelength tuning of an ECL to be achieved without mode hops. This approach eliminates the need for fine mechanical translation of both the optical gain medium and/or optical elements (e.g., diffraction grating and tuning mirror).

While the embodiments described below are directed to the external cavity of a tunable ECL, various other systems that contain an optical path can use the invention to controllably adjust a respective optical path length without changing the physical length of the optical path. For example, the invention can be used in an interferometer (Mach-Zender, Michelson) application for delaying one leg of a split beam prior to reconvergence of the split beams. The invention can also be used in similar configurations where it may be useful to cause light beams modulated with digital pulses or other waveforms to "overlap" when the beams are converged. The invention can also be used in a translator such as between a lens and a focusing plane to adjust the effective focal length of the lens. The insertion of the transparent refractive element adjusts the focal length due to refraction by the transparent refractive element. In some embodiments, the invention could also be used as a focusing element.

Referring now to the figures, FIGS. 2A–2C illustrate the effect of introducing a transparent refractive element, such as a shim, into the optical path to adjust the optical path length of the optical path. The optical path illustrated in FIG. 2B generally illustrates an embodiment of an external cavity in which adjustment of the optical path length is provided without changing the physical length of the optical path. As shown in FIG. 2A, an optical path 200 is formed by arranging a semiconductor light-emitting diode 110, a collimating lens 120, and a tuning mirror 160. The optical path 200 is bounded at a first end by the reflective rear facet 118 of the diode 110 and on a second end by the tuning mirror 160. Light is emitted from the diode 110 is collimated by the lens 120 and impinges upon the tuning mirror 160. When the diode 110, collimating lens 120, and tuning mirror 160 are properly arranged, a substantial portion of the light at a wavelength λ emitted from the diode 110 returns to the diode 110 and lasing action occurs at the wavelength λ. Alternatively, the rear facet 118 can be made non-reflecting and another reflecting element (not shown), such as a mirror, can be used to define the first end of the optical path 200.

In accordance with the invention, optical path length 230 of optical path 200 is adjusted without changing the relative position of the diode 110 and the tuning mirror 160 by introducing a transparent refractive element 220 into the optical path 200 as illustrated in FIG. 2B. When the index of refraction of the transparent refractive element 220 is different from the refractive index of the medium traversed by the light emitted from the diode 110 (e.g., air) and the thickness of the transparent refractive element are known, the increase Δlength in optical path length is determined from the following relationship:

$$\Delta \text{length} = (n_e - n_c) \times t, \qquad \text{Eq. 1}$$

where $n_e$ is the index of refraction of transparent refractive element 220, $n_c$ is the index of refraction of the medium (e.g., air having an index of refraction of approximately one) in the external cavity, and t is the thickness of the transparent refractive element 220. For example, when the transparent refractive element 220 is a glass shim having a thickness of 100 μm and an index of refraction $n_e$ of 1.5, and the external cavity traverses air having an index of refraction $n_c$ of 1.0, the optical path length 230 of the optical path 200 is longer by 50 μm (i.e., [1.5−1.0]×100 μm=50 μm) than the optical path length of optical path 200 without transparent refractive element 220. Consequently, the optical path length 230 can be adjusted without translating the diode 110 as was necessary in the prior art.

A plurality of transparent refractive elements 220 (e.g., glass shims) constructed from the same material and selected from a set of transparent refractive elements having different respective thicknesses can be introduced into the optical path 200 to selectively adjust the optical path length 230. The selection of transparent refractive element thicknesses and the number of transparent refractive elements 220 depends on several factors. One factor is the known precision of the assembly equipment used to construct the optical path 200. A second factor is prior knowledge of the range of the refractive index and the range of the length of the optical gain medium in the diode 110. A third factor is knowledge of the minimum available thickness of the transparent refractive element 220.

FIG. 2C illustrates the conventional approach where optical path length 232 is increased by moving diode 110 a distance $t(n_e-n_c)$ to increase the physical length of the optical path 200. In the embodiment illustrated in FIG. 2A, the optical path length is equal to the sum of the product of the thickness (along the axis of the optical path) and the index of refraction of all elements constituting the optical path, i.e., the diode 110, the collimating lens 120, the medium (e.g., air) between the diode 110 and the collimating lens 120 and the medium (e.g., air) between the collimating lens 120 and the turning mirror 160. In the embodiment illustrated in FIG. 2B, the physical path length is unchanged from the embodiment illustrated in FIG. 2A. However, introduction of transparent refractive element 220 increases the optical path length by $t(n_e-n_c)$. In the embodiment shown in FIG. 2C, the optical path length 232 has been increased by increasing the physical length of the optical path by a distance equal to $t(n_e-n_c)$, as in a conventional ECL.

A wide selection of transparent refractive element thicknesses can provide a fine degree of correction for alignment tolerance and device tolerance of the diode 110, lens 120, and tuning mirror 160. One option to reduce the production and inventory costs associated with managing a large number of transparent refractive elements 220 with different thicknesses is to select a reduced number of thicknesses that can be combined to give a wide range of total thicknesses with a constant total thickness increment. For example, transparent refractive elements 220 with thicknesses of 100 μm, 150 μm, 200 μm, 300 μm, 450 μm, and 700 μm are representative of a minimum set that can provide, with a single transparent refractive element 220 or a combination of two transparent refractive elements 220, a total thickness value range from 100 μm to 900 μm in increments of 50 μm, as indicated in the representative set of combinations below.

| | |
|---|---|
| 100 μm | (the 100 μm thick element) |
| 150 μm | (the 150 μm thick element) |
| 200 μm | (the 200 μm thick element) |
| 250 μm = 100 μm + 150 μm | (the 100 μm and the 150 μm thick elements) |
| 300 μm | (the 300 μm thick element) |
| 350 μm = 150 μm + 200 μm | (the 150 μm and the 200 μm thick elements) |
| 400 μm = 100 μm + 300 μm | (the 100 μm and the 300 μm thick elements) |
| 450 μm | (the 450 μm thick element) |
| 500 μm = 200 μm + 300 μm | (the 200 μm and the 300 μm thick elements) |
| 550 μm = 100 μm + 450 μm | (the 100 μm and the 450 μm thick elements) |
| 600 μm = 150 μm + 450 μm | (the 150 μm and the 450 μm thick elements) |
| 700 μm | (the 700 μm thick element) |
| 750 μm = 300 μm + 450 μm | (the 300 μm and the 450 μm thick elements) |
| 800 μm = 100 μm + 700 μm | (the 100 μm and the 700 μm thick elements) |
| 850 μm = 150 μm + 700 μm | (the 150 μm and the 700 μm thick elements) |
| 900 μm = 200 μm + 700 μm | (the 200 μm and the 700 μm thick elements) |

The representative set of transparent refractive elements 220 configured as shims as described above is presented to illustrate a mechanism for controllably adjusting the optical path length 230 of an optical path 200 without changing the physical length of the optical path. Additional shims having thicknesses other than those described in the representative set are possible. A plurality of transparent refractive elements 220 constructed from different transparent materials each with a respective refractive index can be introduced into the optical path 200 to selectively adjust the optical path length 230.

Mode hops in laser systems are associated with sudden changes in the intensity of the emitted light. A mode hop occurs when the laser has a higher gain in a mode other than the lasing mode. Consequently, both positional changes of the elements that define the physical length of the optical path (i.e., the diode 110 and the tuning mirror 160) and adjustments of the optical path length are associated with intensity changes in the emitted light until an optimum optical path length is found. The optimum optical path length for the optical path occurs when the number of mode hops detected as the tuning mirror 160 (FIG. 1) is rotated is minimized and/or eliminated. Thus, an ECL can be optimized by introducing transparent refractive elements 220 while rotating the tuning mirror 160 and monitoring the intensity of the emitted light until an optimum optical path length is attained.

Reference is now directed to FIG. 3, which presents a cross-sectional view of the representative transparent refractive element 220 of FIG. 2B. As shown in FIG. 3, one or both of the surfaces 221 of the transparent refractive element 220 are coated with an anti-reflective layer 222 to prevent undesired reflection of light by the transparent refractive element. The surfaces of the collimating lens 120 and the front facet of the diode 110 may also be coated with an anti-reflective layer (not shown). For example, the surface of transparent refractive element 220 and the other optical elements may be coated with a relatively thin film of a transparent dielectric substance, such as magnesium fluoride ($MgF_2$, n=1.38), to reduce reflection at the respective surfaces. However, it is, in practice, advantageous to use stacks of multiple dielectric layers to provide a better anti-reflection coating over a wider wavelength range as is known in the art.

Figure 4:
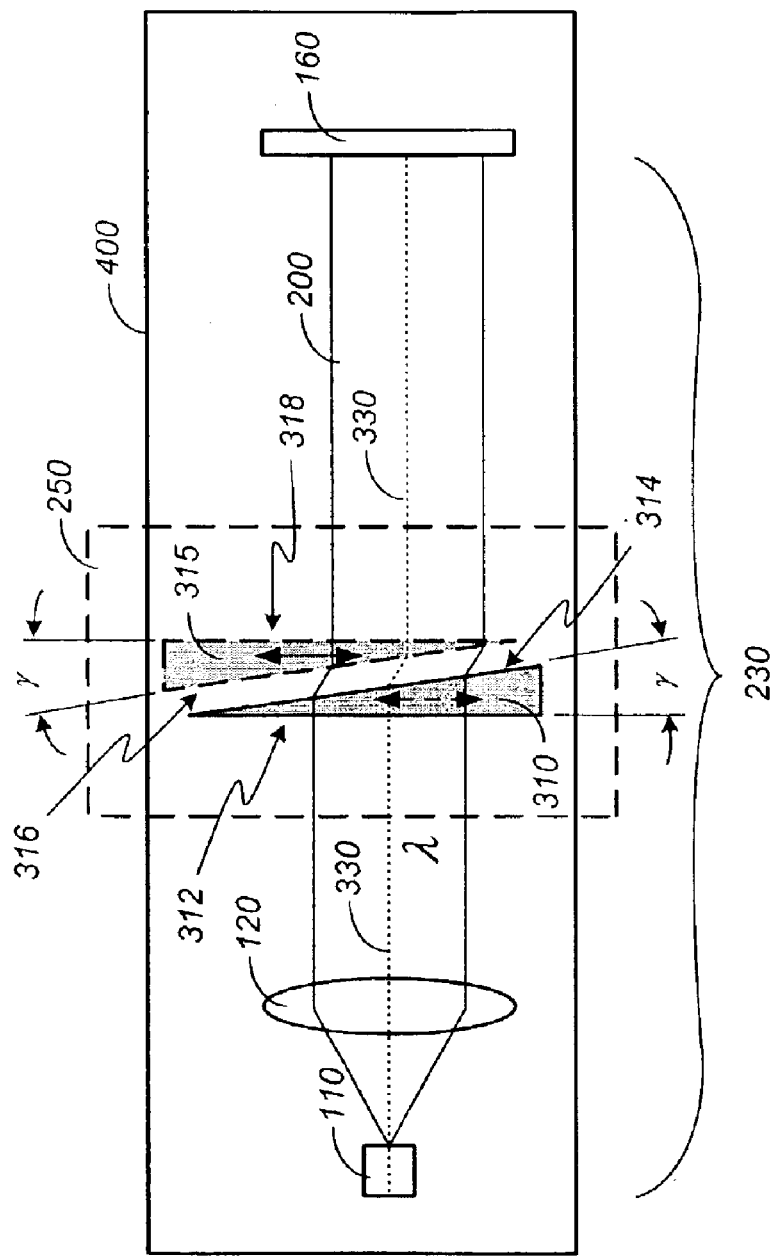
FIG. 4 is a schematic diagram illustrating the effect of introducing a pair of representative transparent refractive elements into an optical path.

FIG. 4 generally illustrates a first embodiment of an optical path whose optical path length is capable of continuous adjustment without changing the physical length of the optical path. The optical path extends between the reflective rear facet of the semiconductor light-emitting diode 110 and the tuning mirror 160. As illustrated in FIG. 4, a base 400 can be used to support a transparent refractive element 250 placed in the optical path 200. Transparent refractive element 250 includes a first wedge 310 and a second wedge 315. The first and second wedges 310, 315 can be made of glass or other transparent materials that can be formed into a wedge.

The first wedge 310 is attached to the base 400 such that it remains fixed in optical path 200. As illustrated in FIG. 4, the first wedge 310 is arranged such that light emitted from the diode 110 is incident orthogonally on a first surface 312. The light is refracted at the second surface 314, which is sloped, i.e., the second surface is non-orthogonal to optical path 200.

The second wedge 315 is mounted such that it is controllably translated along a plane that intercepts the optical path 200. The second wedge 315 is arranged such that a second surface 316 is sloped, i.e., is non-orthogonal to optical path 200, and a first surface 318 is orthogonal to optical path 200. When the first and second wedges 310, 315 are arranged in relatively close proximity to one another and with second surface 314 parallel to second surface 316, light that exits the second surface 314 of the first wedge 310 travels toward the second wedge 315. The second wedge 315 refracts the light so that the light that exits the second wedge 315 is parallel to the light collimated by lens 120. The differing thickness of the second wedge 315 at different locations along a plane orthogonal to the optical path 200 provides a mechanism for continuously adjusting the optical path length 230.

Alternatively, second wedge 315 can slide in contact or nearly in contact with first wedge 310 along a plane defined by second surfaces 314 and 316. This arrangement minimizes the offset of the light beam orthogonal to the direction of the optical path 200. In a variation of this embodiment, wedge 310 is also movably mounted, and wedge 310 and wedge 315 are moved in parallel but opposite directions to obtain a greater range of optical path length change.

It should be understood that structures may be provided to guide the second wedge 315 along a path orthogonal to the optical path 200 or parallel to the surface 314 of wedge 310. Such structures are not shown in the drawing as they are not required to comprehend the representative optical systems and methods. Such structures may include a mounting fixture, a slot, a surface, among others.

As described above with regard to the optical path illustrated in FIGS. 2A through 2C, the first and second surfaces 312 and 314 of the first wedge 310 and the second and first surfaces 316 and 318 of the second wedge 315 may each be coated with an anti-reflective layer. To ensure that wedges 310 and 315 introduce a minimum lateral offset into optical path 200, it is desirable to construct the first and second wedges 310, 315 from materials having similar properties and to form the wedges 310, 315 with the same angle γ. It is also desirable to keep the wedges 310, 315 close together to minimize optical path offset.

Figure 5:
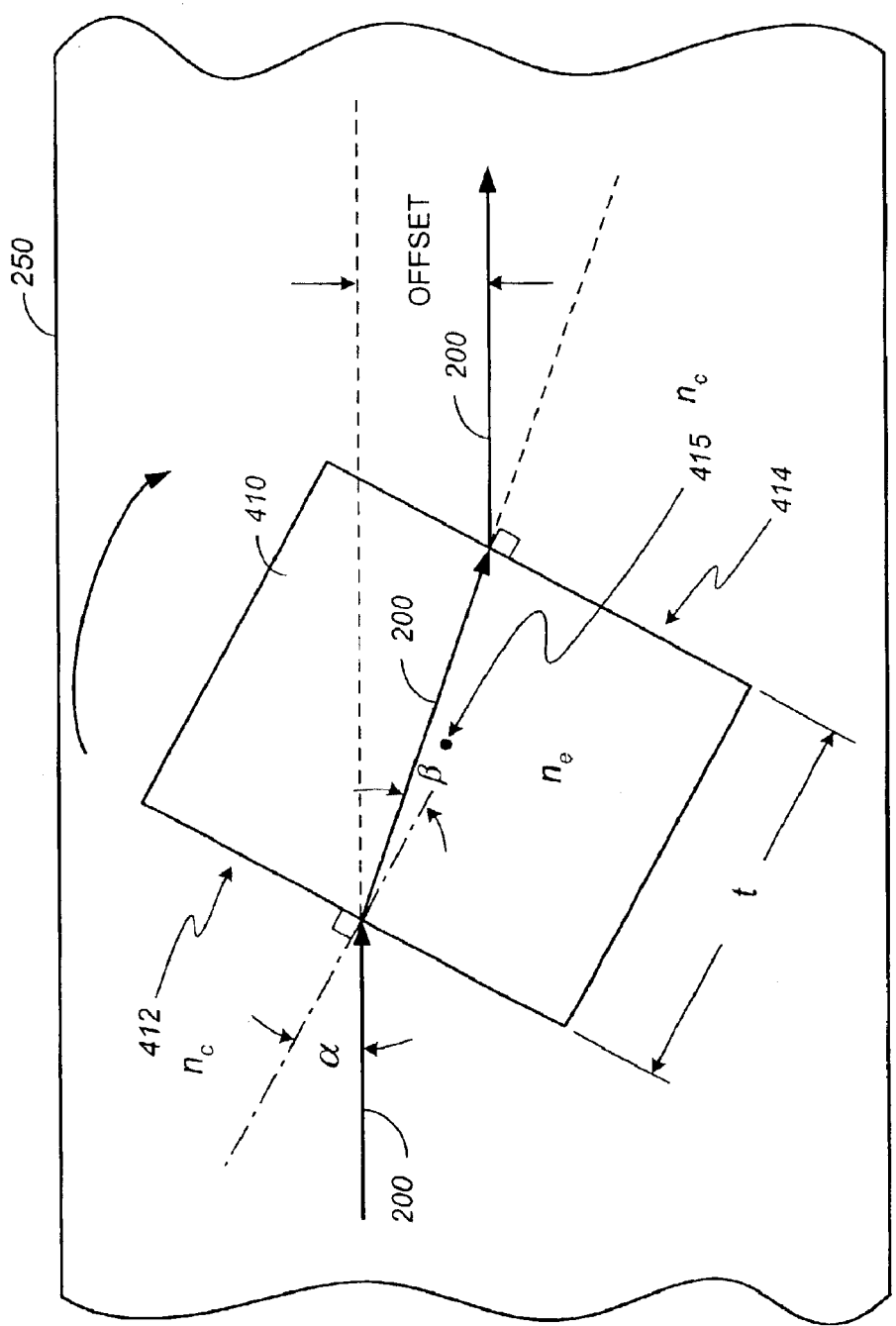
FIG. 5 is a schematic diagram illustrating the effect of introducing a rotatable transparent refractive element into an optical path.

A second embodiment of a transparent refractive element 250 that provides a continuous optical path length adjustment without changing the physical length of the optical path is illustrated in FIG. 5. FIG. 5 shows a transparent refractive element 410 with a thickness t and an index of refraction $n_e$ greater than the index of refraction of the surrounding optical path medium $n_c$. Transparent refractive element 410 is located in the optical path 200 and used to controllably adjust the optical path length 230. The optical path length (defined as above) is changed by rotating the transparent refractive element 410 about an axis passing through pivot 415. The expression for the increase Δlength in the optical path length as the transparent refractive element 410 is rotated by an angle, α, from an orthogonal angle of incidence is as follows:

$$\Delta length = t \times \left[ \left( \frac{n_e}{\cos\beta} \right) - \left( \frac{n_c \times \cos(\alpha - \beta)}{\cos\beta} \right) - n_e + n_c \right], \quad \text{Eq. 2}$$

where β is the angle of refraction inside the transparent refractive element 410 given by Snell's Law as $$\beta = \arcsin\left( \frac{n_c}{n_e} \times \sin\alpha \right). \quad \text{Eq. 3}$$

Rotation of the transparent refractive element 410 about pivot 415 also produces a lateral offset in the optical path 200. The lateral offset in the optical path 200 is defined by the following expression:

$$\text{offset} = t \times \left( \frac{\sin(\alpha - \beta)}{\cos\beta} \right). \quad \text{Eq. 4}$$

A control mechanism (not illustrated) may be added to adjust the optical path length by rotating transparent refractive element 410 about pivot 415. In the illustrated embodiment, clockwise rotation of the transparent refractive element 410 about pivot 415 from the position shown in FIG. 5 will increase the optical path length 230 without moving the diode 110 or the tuning mirror 160 (FIGS. 2A–2C). Conversely, counter-clockwise rotation of the transparent refractive element 410 about pivot 415 from the position shown in FIG. 5 will decrease the optical path length. A motor (e.g., a DC motor) can be arranged with a worm gear, a rack and pinion gear, or another mechanical linkage to controllably rotate the transparent refractive element 410 about pivot 415.

Alternatively, the transparent refractive element 410 may be rotated by an external device and then locked into position after the optical path length adjustment has been made. For example, the optical path length adjustment may be performed by an external test fixture that rotates the transparent refractive element 410 until the optical path length adjustment is optimized. The transparent refractive element 410 is then locked in its adjusted position by, for example, curing an ultraviolet-curable adhesive. The transparent refractive element 410 is then disengaged from the test fixture.

As described above with regard to the optical system illustrated in FIGS. 2A through 2C, the first and second surfaces 412 and 414 of the transparent refractive element 410 may be coated with an anti-reflective layer.

Figure 6:
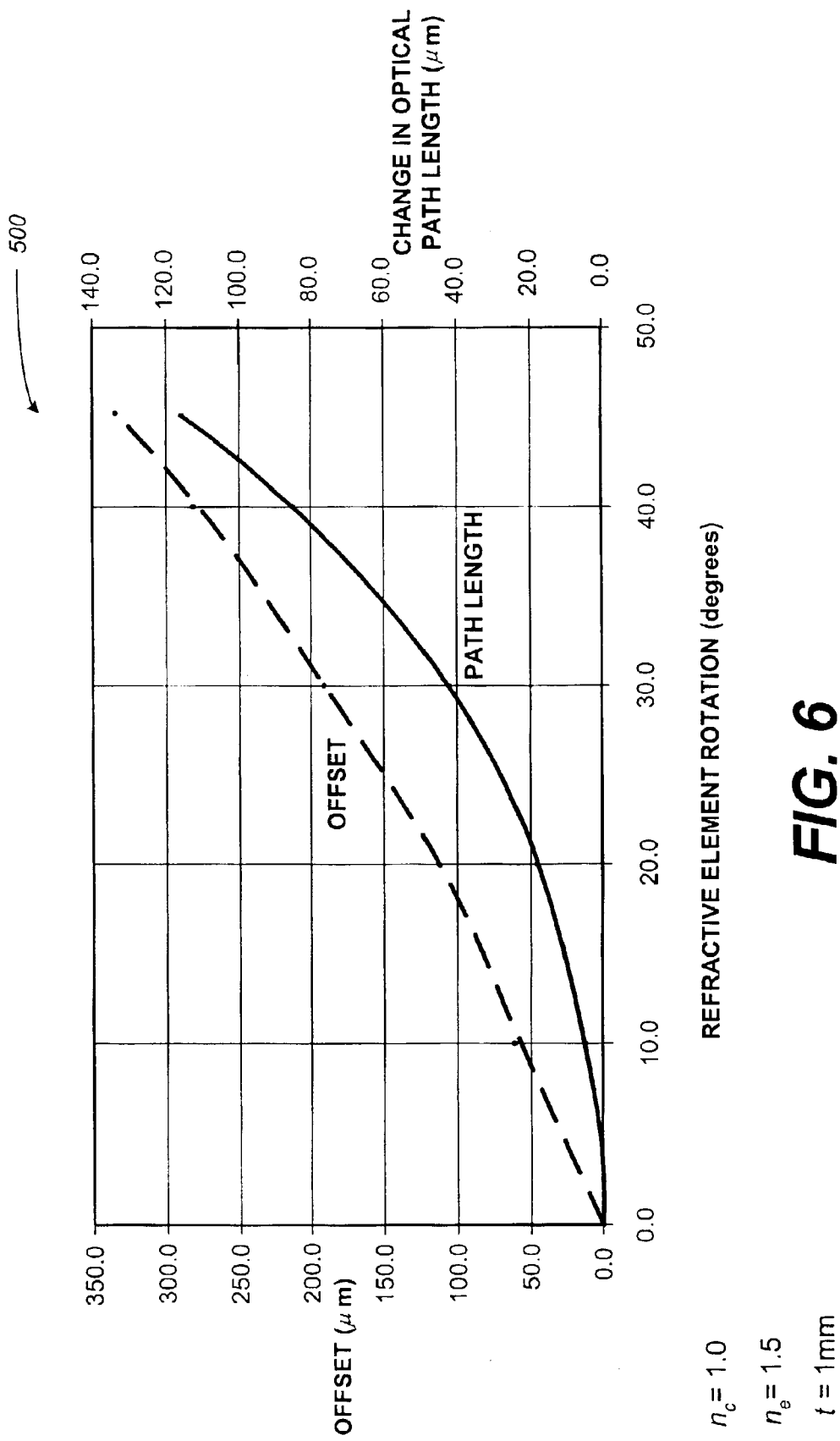
FIG. 6 is a plot illustrating the relationships between optical path offset and optical path length as functions of transparent refractive element tilt for a particular embodiment of the rotatable transparent refractive element of FIG. 5.

As an example of the embodiment illustrated in FIG. 5, the plot 500 of FIG. 6 shows the calculated change in the optical path length and the lateral offset as a function of the rotation angle of a transparent refractive element 410 constructed of glass (index of refraction of 1.5) having a thickness of 1 millimeter (mm). As shown in the plot, the lateral offset varies nearly linearly from 0 μm at an angle of rotation of 0 degrees (i.e., when the first and second surfaces 412, 414 are orthogonal to optical path 200) to approximately 330 μm when the angle of rotation is 45 degrees. The change in the optical path length 230 varies non-linearly from 0 μm at an angle of rotation of 0 degrees to approximately 118 μm when the angle of rotation is 45 degrees.

The relatively small tunable laser cavity in an ECL assembly offers only a small amount of space for mounting the various embodiments of transparent refractive element 250 described above. A compact mounting fixture for mounting the shims 220 (see FIG. 2B) and or the wedges 310, 315 (see FIG. 4) occupies a small amount of space and permits quick insertion and/or replacement of the various-transparent refractive elements (e.g., the shims 220). The perspective view of FIG. 7A illustrates a first embodiment of a mounting fixture 600 that may be used to arrange two shims 220 of different thickness.

Figure 7B:
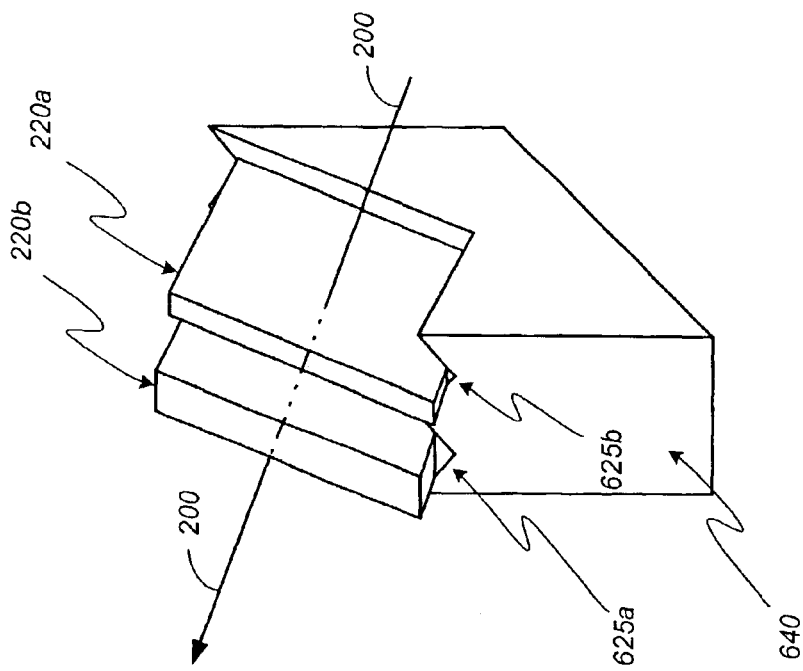
FIGS. 7A and 7B are perspective and isometric views illustrating alternative embodiments of a mounting fixture that can be used to arrange multiple transparent refractive elements in an optical path.
Figure 7A:
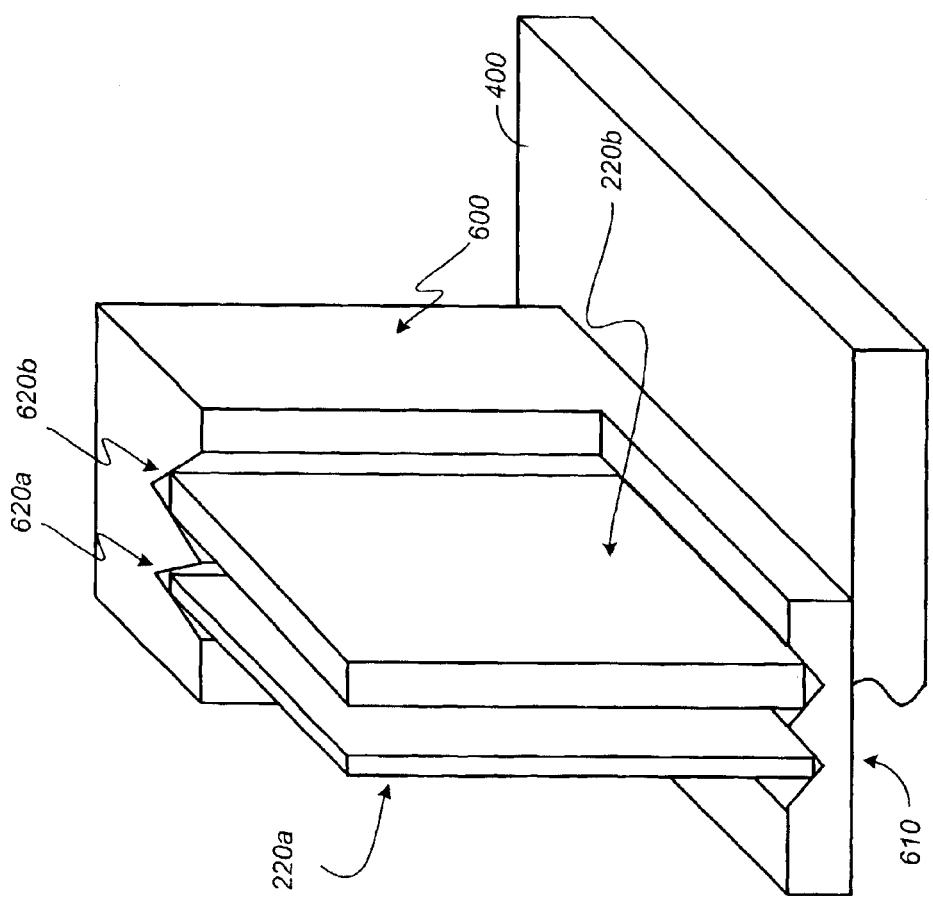

As illustrated in FIG. 7A, the mounting fixture 600 may be configured with a mounting surface 610 and one or more grooves 620. The mounting surface 610 may be fixedly attached to a portion of the mounting surface (e.g., the upper surface) of the base 400. In the configuration illustrated in FIG. 7A, V-shaped grooves 620a and 620b are provided with the respective openings wide enough to easily receive shims 220 of different thickness ranges. V-shaped groove 620a is configured to receive and properly align shim 220a orthogonal to the optical path 200 along two of its four non-optical faces. Similarly, V-shaped groove 620b is configured to receive and properly align shim 220b along two of its four non-optical faces. The V-shaped grooves 620a, 620b are also convenient for containing any excess adhesive when adhesives are applied to the one or more shims 220 selected for a particular application. Moreover, the mounting fixture 600 may be configured in a generally open arrangement to permit easy insertion and/or removal of the shims 220.

Mounting fixture 640, illustrated in FIG. 7B represents an alternative configuration of a suitable holder for a plurality of shims 220. As shown in FIG. 7B, mounting fixture 640 may be fixed to a portion of the base 400. In contrast to the V-shaped grooves 620a, 620b introduced with mounting fixture 600 in FIG. 7A, the V-shaped grooves 625a, 625b illustrated in FIG. 7B, are rotated 45° in a plane substantially orthogonal to the optical path 200. In the configuration illustrated in FIG. 7B, V-shaped grooves 625a and 625b are provided with the respective openings wide enough to easily receive shims 220 of the contemplated range of thicknesses. V-shaped groove 625a is configured to receive and properly align shim 220a along two of its four non-optical faces. Similarly, V-shaped groove 625b is configured to receive and properly align shim 220b having a different range of thicknesses than shim 220a along two of its four non-optical faces. As described above with regard to the mounting fixture 600 of FIG. 7A, the V-shaped grooves 625a, 625b are also convenient for containing any excess adhesive when adhesives are applied to the one or more shims 220 selected for a particular application. Furthermore, the mounting fixture 640 also presents a generally open arrangement to permit easy insertion and/or removal of the shims 220. Moreover, it is significant to note that while the shims 220 of FIGS. 7A and 7B are depicted as parallelograms (e.g., squares or rectangles), other configurations may be selected and the shims arranged with the mounting fixtures 600, 640. For example, elliptical and/or circular shims 220 can be arranged with the mounting fixtures 600, 640.

Figure 8:
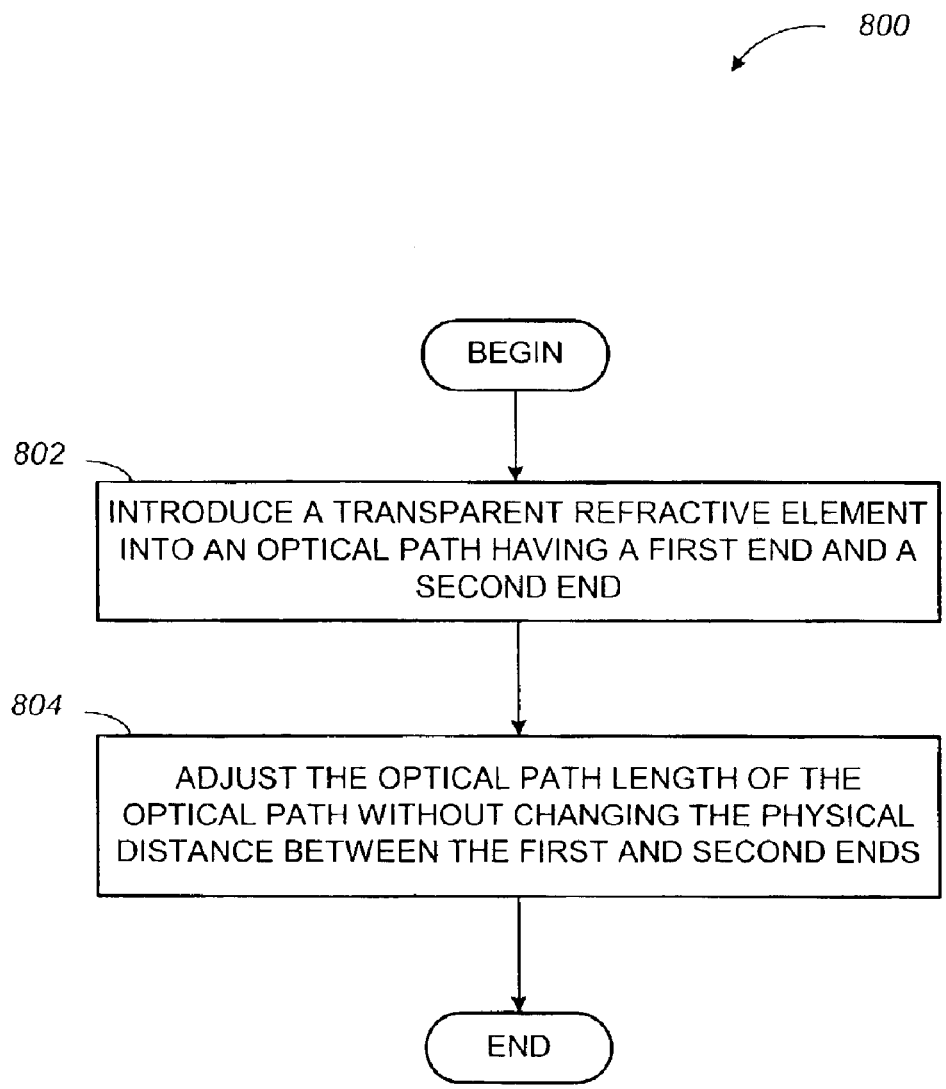
FIG. 8 is a flow diagram illustrating an embodiment of a representative method for constructing an optical path.

Reference is now directed to FIG. 8, which presents an embodiment of a representative method for modifying the optical path length of an optical path having a first end and a second end. Illustrated method 800 begins with block 802 where a transparent refractive element is introduced into the optical path. Thereafter, as shown in block 804, the transparent refractive element is adjusted to change optical path length without changing the physical distance between the first end and the second end of the optical path.

Figure 9:
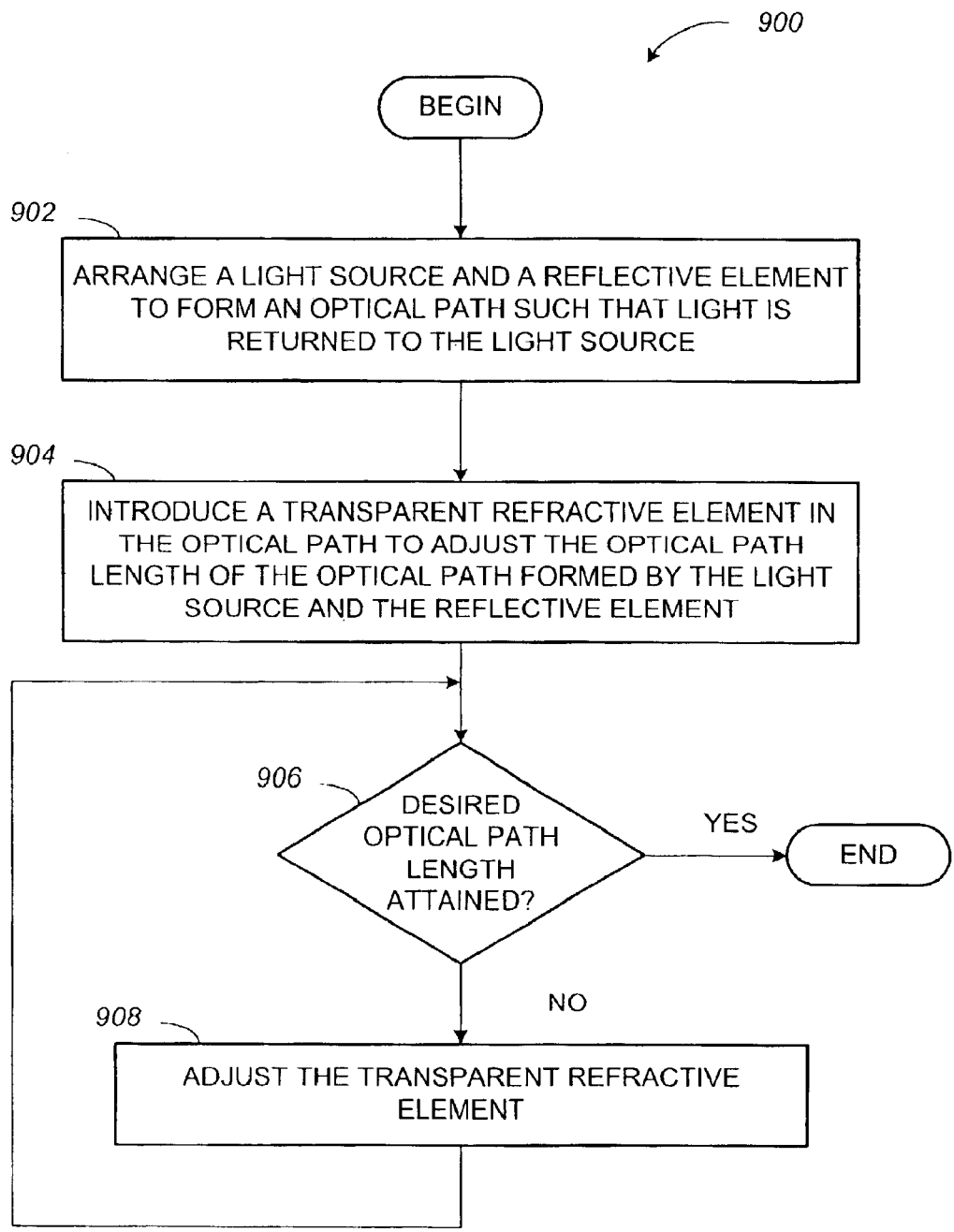
FIG. 9 is a flow diagram illustrating another sample embodiment of a method for lengthening an optical path.

FIG. 9 illustrates an embodiment of a method for controllably adjusting the optical path length of an optical path. As shown in FIG. 9, method 900 begins with block 902 where a light source and a reflective element are arranged to form an optical path. As described above, the light may be directed to impinge upon the reflective element so that the light is returned to the light source along a reciprocal optical path. Next, as shown in block 904, an adjustable transparent refractive element is introduced in the optical path.

Thereafter, as illustrated in block 906, a determination is made whether the modified optical path length matches a desired optical path length. For example, in an ECL, the desired optical path length is one optimized to either minimize or eliminate mode hops. The optimum optical path length is determined by adjusting the optical path length until rotation of the reflective element about a pivot point results in a reduced number or elimination of mode hops. When the result of the query in 906 is negative, the transparent refractive element is adjusted as indicated in block 908. It should be understood that the particular modification required will depend on the adjustable transparent refractive element(s) applied in the optical system.

For example, when shims are used as the transparent refractive element, the transparent refractive element is adjusted by selecting shims of different thicknesses and/or materials. Alternatively, when the transparent refractive elements are wedges, translation of one or both of the wedges in a direction substantially orthogonal to the optical path can be employed to adjust the transparent refractive element. Moreover, rotating a transparent refractive element about an axis can be used to adjust the transparent refractive element. As illustrated by the flow control arrow that exits 908, the query 906 and adjustment 908 may be repeated as necessary. Otherwise, when the result of query of step 906 is affirmative, i.e., the desired optical path length has been attained, the method 900 may terminate.

The detailed description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

We claim:

1. An optical path having a first end and a second end, comprising:
   a first transparent refractive element located in the optical path between the first end and the second end, the transparent refractive element being adjustable to provide an increase in optical path length without changing the physical distance between the first end and the second end.

2. The optical path of claim 1, wherein the first transparent refractive element comprises a first surface and a second surface, the first and second surfaces each comprising an anti-reflective layer.

3. The optical path of claim 1, further comprising:
   a mounting fixture arranged to receive the first transparent refractive element.

4. The optical path of claim 3, wherein the mounting fixture comprises a channel.

5. The optical path of claim 4, wherein the channel is V-shaped.

6. An optical path having a first end and a second end
   a first transparent refractive element located in the optical path between the first end and the second end, the transparent refractive element being adjustable to adjust the optical path length of the optical path without changing the physical distance between the first end and the second end: and
   a mounting fixture comprising a channel arranged to receive the first transparent refractive element, wherein the channel engages a plurality of sides of the transparent refractive element.

7. The optical path of claim 6, wherein the first transparent refractive element is rotatable about an axis substantially orthogonal to the optical path.

8. The optical path of claim 6, further comprising:
a second transparent refractive element located between the first end and the second end.

9. The optical path of claim 8, wherein the second transparent refractive element comprises a first surface and a second surface, the first and second surfaces each comprising an anti-reflective layer.

10. The optical path of claim 8, wherein the first and second transparent refractive elements each comprise a wedge having a sloped surface, the wedges oriented such that respective sloped surfaces oppose each other.

11. The optical path of claim 10, wherein the transparent refractive elements are movable relative to one another along a vector substantially orthogonal to the direction of the optical path.

12. The optical path of claim 10, wherein the transparent refractive elements are movable relative to one another along a vector substantially parallel to the sloped surfaces.

13. The optical path of claim 10, wherein the wedges have the same slope and the same index of refraction.

14. The optical path of claim 6, additionally comprising an optical gain medium.

15. The optical path of claim 14, wherein the optical gain medium comprises a semiconductor device.

16. The optical path of claim 1, wherein the first transparent refractive element comprises a shim selected from a set of shims having known thicknesses.

17. The optical path of claim 1, further comprising:
a second transparent refractive element located between the first end and the second end.

18. The optical path of claim 17, wherein the first and second transparent refractive elements each comprise a wedge having a sloped surface, the wedges oriented such that respective sloped surfaces oppose each other.

19. The optical path of claim 18, wherein the transparent refractive elements are movable relative to one another along a vector substantially orthogonal to the direction of the optical path.

20. The optical path of claim 18, wherein the transparent refractive elements are movable relative to one another along a vector substantially parallel to the sloped surfaces.

21. The optical path of claim 18, wherein the wedges have the same slope and the same index of refraction.

* * * * *